Aug. 18, 1953
H. BARNETT ET AL
2,649,112
AUTOMATIC RESET RESTRICTION VALVE
Filed April 2, 1945
3 Sheets-Sheet 1
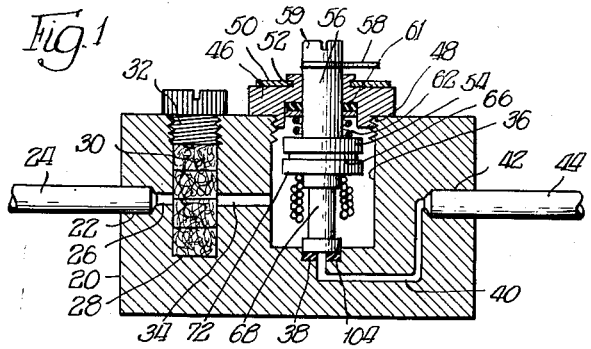
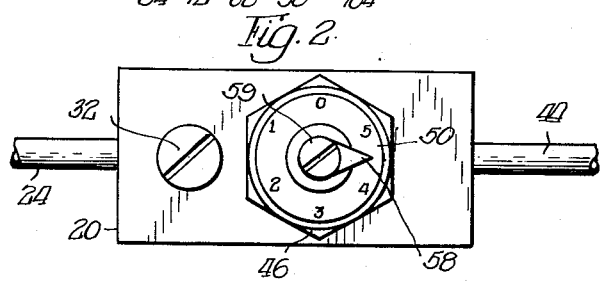
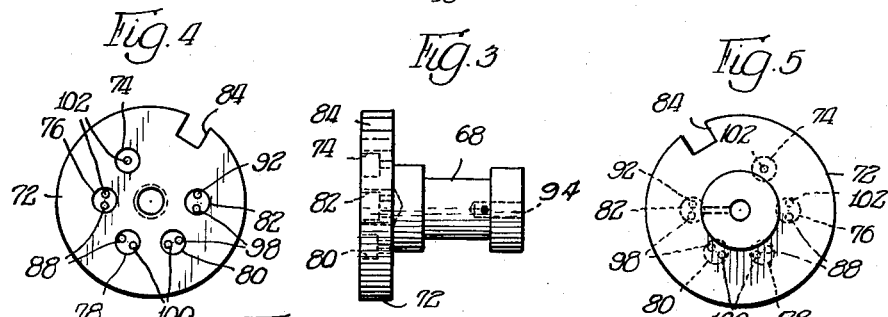
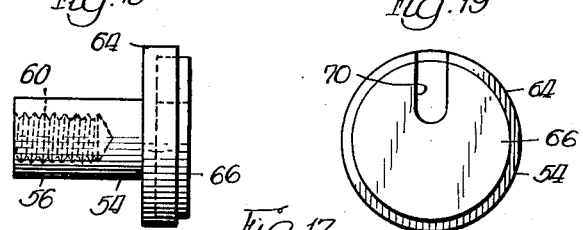
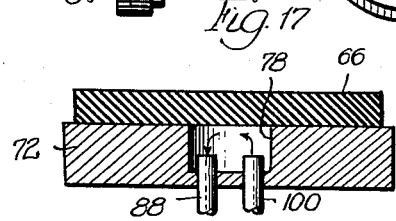
INVENTORS
Harry Barnett,
BY Erwin Saballus,

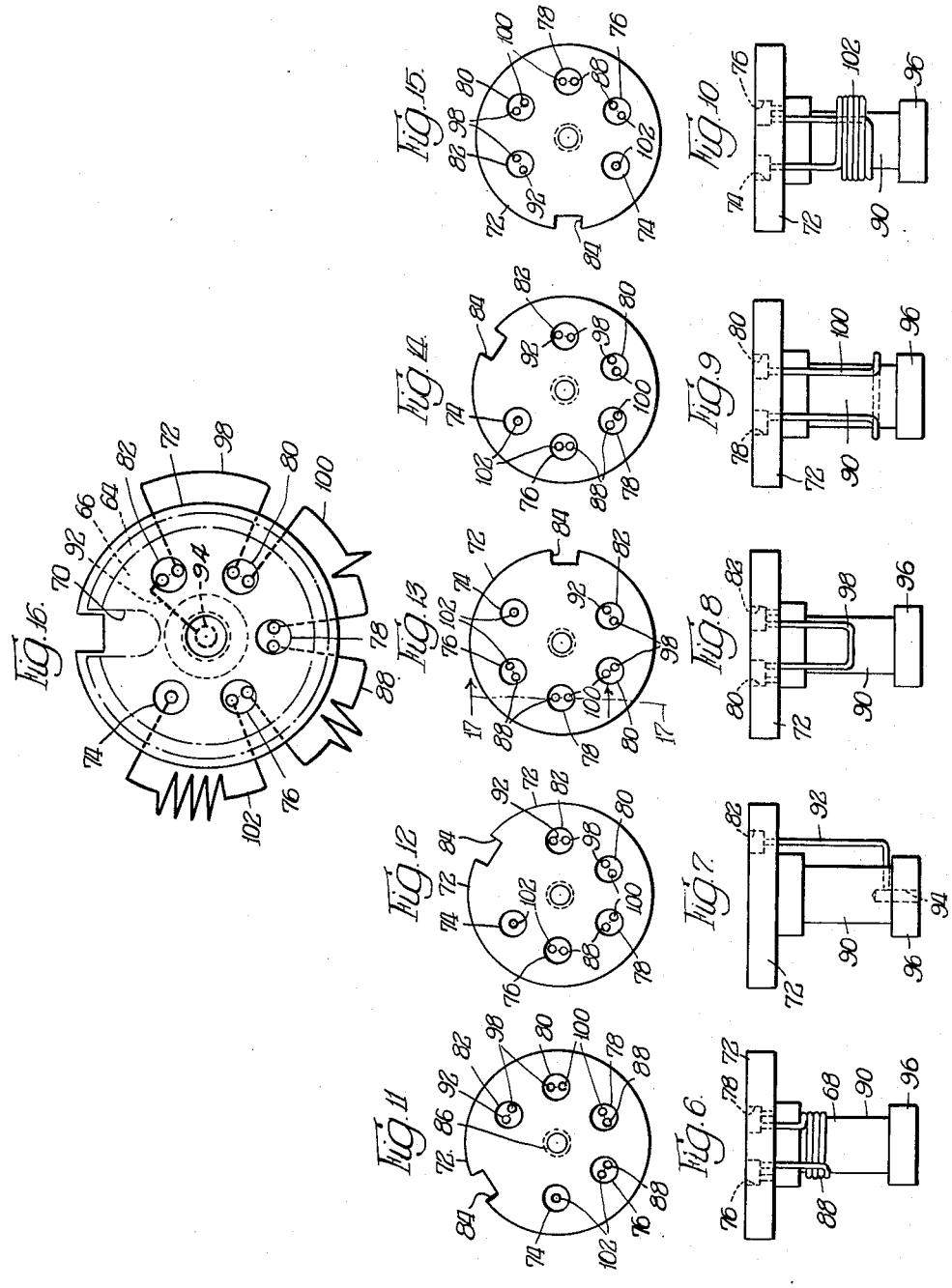

Aug. 18, 1953  H. BARNETT ET AL  2,649,112
AUTOMATIC RESET RESTRICTION VALVE
Filed April 2, 1945  3 Sheets-Sheet 3
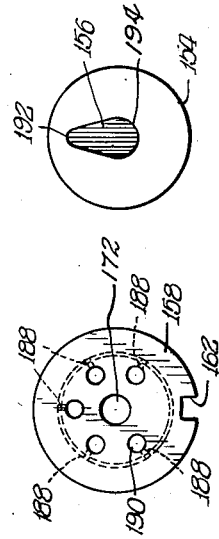
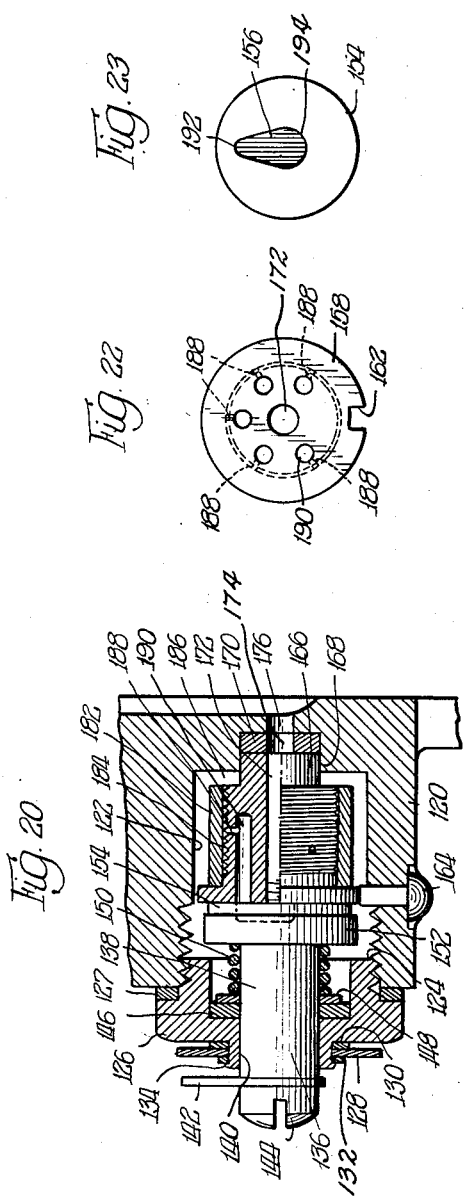
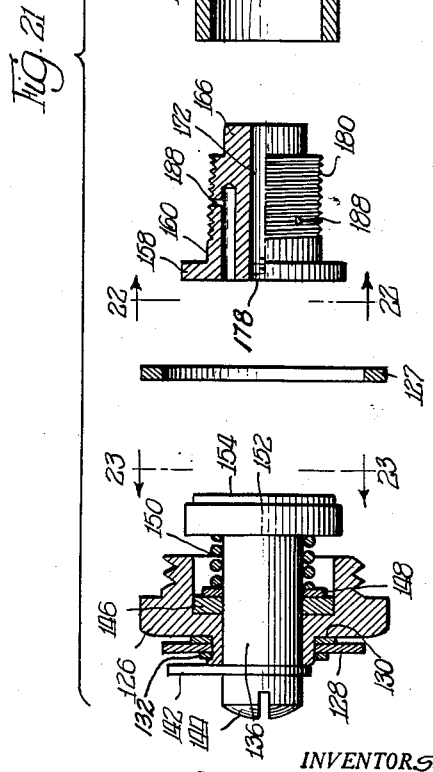
INVENTORS.
Harry Barnett.
BY Erwin Saballus.

Patented Aug. 18, 1953

2,649,112

UNITED STATES PATENT OFFICE 2,649,112

AUTOMATIC RESET RESTRICTION VALVE

Harry Barnett, Glencoe, and Erwin Saballus, Chicago, Ill., assignors to The Powers Regulator Company, Chicago, Ill., a corporation of Illinois Application April 2, 1945, Serial No. 586,124

13 Claims. (Cl. 137—555)

1

This invention relates to valve mechanism and more particularly to valve mechanism for regulating fluid flow in predetermined amounts utilizing flow areas of substantially constant section.

In pneumatic control instruments and related devices, particularly of the reset type such as disclosed in Patents No. 1,985,829, Hubbard and Re. 20,093, Mason, it is desireble to employ automatic reset restriction valves which may be selectively operated to vary the delivery of fluid therethrough. Such a reset control system utilizes a damping arrangement including an orifice which is preferably adjustable so that the damping time can be changed at will to compensate for various time lags encountered in service.

There are other mechanisms which require accurate throttling valves such as pilot valve controls. In the past, such control of a small flow of air or gas has usually been effected by the use of a needle valve. However, the results obtained by the use of such needle valves are not uniform and a given setting of a needle valve does not always give uniformly reproducible results. Furthermore, such needle valves occasionally clog owing to dust and other foreign matter which collects therein from the air or gas passing therethrough, and commercially it is difficult to make control valves which are alike.

It is thus an object of this invention to provide an adjustable orifice or vernier valve of such construction that it can be calibrated for adjustment and for each such adjustment, conditions are always substantially reproducible.

Another object of the invention is to provide an adjustable orifice or vernier valve of simple inexpensive construction whereby such valves can be manufactured with a high degree of uniformity and at low cost.

Another object of the invention is to provide a valve wherein the rate of flow therethrough is controlled by capillary tubing whereby the area of the valve is constant.

Another object of the invention is to provide a valve which is predetermined so that there are a number of rates of flow therethrough as distinguished from a valve adjustable for an infinite number of rates of flow.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a sectional elevation of a form of valve assembly embodying the invention;

Figure 2 is a top plan view of the valve assembly illustrated in Figure 1;

Figure 3 is an enlarged side elevation of the valve body of the valve assembly illustrated in Figure 1;

Figure 4 is a top plan view of the valve body illustrated in Figure 3;

Figure 5 is a bottom plan view of the valve body illustrated in Figure 3;

Figures 6 to 10 inclusive are side elevations of different views of the valve body illustrated in Figure 3, showing the different capillary tubes in place, each figure omitting the other capillary tubes;

Figures 11 to 15 are top plan views of the different views of the valve body, the views, respectively, corresponding to the positions of the valve body shown in Figures 6 to 10 inclusive.

Figure 16 is a top plan view showing the capillary tubes of the valve body in developed and related positions, and showing the valve disk (in dotted lines) in position where the valve is inoperative;

Figure 17 is an enlarged fragmentary sectional elevation taken substantially in the plane as indicated by the line 17—17 of Figure 13, illustrating the capillary tube ends of adjacent tubes in one of the recesses of the valve body and showing the valve disk in position for closing the recess;

Figure 18 is a side elevation of the valve disk and holder assembly;

Figure 19 is a top plan view of the disk and holder assembly illustrated in Figure 18;

Figure 20 is a fragmentary sectional elevation of a modified form of valve assembly embodying the invention;

Figure 21 is an exploded fragmentary sectional view of certain of the valve parts of the valve assembly illustrated in Figure 20;

Figure 22 is a top plan view of the valve body of the assembly illustrated in Figures 20 and 21, the same looking in the direction of the arrows 22—22 of Figure 21; and Figure 23 is a plan view of the valve disk of the valve assembly illustrated in Figures 20 and 21, the same looking in the direction of the arrows 23—23 of Figure 21.

In the valve assembly shown, the valve housing 20 is provided with the inlet 22 which by way of example may be attached to the pipe 24 connected to one side of a differential bellows, or to an air relay. This may be utilized in a reset control mechanism such as shown in Patent No. Re. 20,092, granted September 1, 1936. The inlet 22 is connected through the passage 26 to the filter chamber 28 in which the filter 30 is disposed, the chamber being closed by the threaded closure 32. The filter chamber is connected through the passage 34 to the valve chamber 36 provided with the bottom recess 38 communicating with the passage 40, provided with the outlet 42 which by way of example may be connected through a pipe 44 to the opposite side of the differential bellows to that to which the tube 24 is connected.

The upper end of the chamber 36 is closed by the cap or closure 46 threaded thereto as at 48, said cap being provided with the dial 50 which is frictionally disposed as at 52 on the cap 46 whereby the dial may be rotated to a predetermined selected position after the valve assembly has been completed. The movable head assembly 54 is provided with the stem 56 extending through the closure 46 and the pointer 58 is secured thereto as by the threaded bolt 59, the stem 56 having threads 60 for receiving the complementary threads of the bolt. The pointer provides convenient means for determining the setting of the movable head assembly 54 with respect to the dial 50.

A rubber washer 61, or other suitable fluid sealing means, is disposed within the cap 46 and a spring 62 is interposed between the washer 61 and the disk holder 64 for sealing purposes. The disk holder 64 is provided with the disk 66, which in the embodiment shown is a specially treated leather disk and more specifically is saturated with beeswax to prevent the disk from sticking to the adjacent metal surface of the seat member 68. The seat member is disposed so that its axis concides with the axis of the stem 56. The holder 64 and the disk 66 are notched as at 70 for the purpose to be later described and the disk is adapted to act as a valve for the seat member 68.

Said seat member 68 comprises the upper disk or seat member 72 provided with the plurality (shown five) of tube end recesses or openings 74, 76, 78, 80 and 82, of substantially the same size and location on a circle, the center of which is on the axis of the seat member, and said member 72 is provided with the notch 84 for the reception of a positioning screw or pin (not shown) extending through the valve housing 20 for preventing rotation of the seat member. The member 72 is threaded as at 86 for the reception of suitable means whereby the seat member may be removed after removal of the cap 46, and after loosening the retaining screw which is received in the notched portion 84.

One end of the next longest capillary tube 88 is secured (as by soldering) in recess 76 and the tube is coiled around the stem 90 of the seat member and the other end of said tube is secured in the recess 78. Thus communication is had between recesses 76 and 78 through the capillary tube 88.

One end of a capillary tube 92 is secured within the recess 82 and the other end of said tube is extended downwardly and is secured in the axially disposed recess or passage 94 which extends through the bottom seat 96 of the seat member and into the stem 90, this being the shortest capillary tube. Thus communication is had through the tube 92 between recesses 82 and 94 and consequently between recess 82 and passage 40.

One end of capillary tube 98 is secured within recess 80, the other end of said tube being secured within recess 82, this being the second shortest capillary tube. Thus communication is had through tube 98 between recesses 80 and 82.

One end of capillary tube 100 is secured within recess 78, the other end of said tube being connected to recess 80, this being the third shortest capillary tube and the tube intermediate its length is conveniently disposed around stem 90. Thus communication is had through tube 100 between recesses 78 and 80.

One end of capillary tube 102 is secured within recess 74, the other end of said tube being secured within recess 76, this being the longest capillary tube. Thus communication is had through tube 102 between recesses 74 and 76.

It has been found that nickel silver tubing of $\frac{1}{16}$ of an inch O. D. by $\frac{7}{1000}$ I. D. is satisfactory tubing for the valve where used in the mechanism shown and described in said Patent Reissue No. 20,092. The length of the tubes of course are determined by the desired throttling effect and so the use to which the valve is to be used is important.

The bottom seat 96 is adapted to be seated on a sealing washer 104 disposed in recess 38 so that no leakage can occur from the chamber 36 to the passage 40.

When the valve assembly is assembled, the pointer 58 is disposed in position so that the valve disk 66 is in the position illustrated in Figure 16, that is, the valve assembly is inoperative and no liquid can pass from pipe 24 to pipe 44. The dial is then moved so that the zero numeral of the dial corresponds with the position of the pointer. If the pointer is then moved from the zero position on the dial to the first (numeral 1) position on the dial, the notched portion 70 is correspondingly moved so that all of the tubes are used in series to connect pipe 24 to pipe 44. Thus fluid will enter the housing 20 through pipe 24 and pass through the filter 30 and passage 34 to the chamber 36. It will then pass through the notched portion 70 into the recess 74 and enters one end of tube 102 passing through said tube into recess 76. The recess 76 (as well as recesses 78, 80 and 82) is closed to the chamber 36 by the disk 66 so the fluid passes into one end of the tube 88 and is supplied to the recess 78. The fluid then passes through tube 100 into recess 80. From recess 80 the fluid passes through tube 98 to recess 82 and from recess 82 the fluid passes through the tube 92 to the recess 94, from which it passes into the passage 40 and to the tube 44.

When the valve is set in this position the greatest amount of tubing is used so that the greatest resistance to air flow is utilized. When the pointer is moved to the position marked two, the notch 70 is moved to be aligned with the recess 76 and the remaining recesses 74, 78, 80 and 82 are closed by the disk 66. Fluid from the chamebr 36 will then pass through tube 88, tube 100, tube 98 and tube 92 to the recess 40 and pipe 44 and tube 102 will be inoperative. Similarly movement of the pointer 58 to positions marked three, four and five respectively, renders tube 88, 100 and 98 inoperative so that in the final position when the pointer is aligned with the numeral five only the shortest tube 92 will be operative. It is also desirable that the notched portion 70 be of such width that the valve is never closed except when the pointer is a or very closely adjacent to zero that is, it may be said that the portion 70 is adapted to straddle adjacent recesses.

Referring now to the valve assembly illustrated in Figures 20 to 23 inclusive, said assembly comprises the valve housing 120 provided with an inlet (not shown), the inlet communicating through a suitable passage (and filter, if desired) with the valve chamber 122.

The valve chamber 122 is threaded as at 124 for the reception of the cap or closure 126 engaging a sealing washer 127, said closure being provided with the frictionally retained dial 128, settable as described with respect to dial 50, being retained between spring washer 130 and thrust washer 132 disposed to engage the shoulder 134.

The movable head assembly 136 is provided with the stem 138 extending through the opening 140 in the cap and the indicator 142 is secured to said stem by the lock screw 144. A sealing washer 146 is interposed between the cap and the spring thrust washer 148, the spring 150 being interposed between the washer 148 and the disk holder 152, the disk holder being provided with the valve disk 154. The disk and disk holder are provided with a groove 156 for the purpose to be later described.

The disk 154 is rotatably mounted on the upper disk or seat 158 of the seat member 160. The upper disk member 158 is notched as at 162 for the reception of the lock pin 164 extending through the valve housing 120 for preventing rotation of the seat member but the notch 162 is of such proportions that it is not necessary to remove pin 164 to remove the seat member 160. This also is the case in the first modification described. The lower end 166 of the seat member is received in a recess 168 and the seal washer 170 is interposed between the lower end of seat member and the housing 120. The seat member and washer are provided with central passages 172 and 174 which are aligned with the outlet passage 176 in the valve housing, the passage 174 being threaded as at 178 to facilitate assembly or removal of the seat member as by a threaded tool.

The seat member is provided with a screw thread 180, the thread preferably being flattened along the crest, and a sleeve 182 is slipped over said thread, tightly engaging the crest to prevent leakage across said crest, whereby the thread forms a capillary tube or passage 184 when closed by the sleeve 182. The sleeve may be of any suitable material such as metal or plastic and the thread is open at the bottom of the thread as at 186.

Radial passages 188 are provided in the member 160 and in the embodiment shown five of such passages 188 are provided. The passages communicate with the capillary passage at different places along the thread and communicate with the axial passages 190 which extend upwardly and open against the disk 154. The outer edge 192 of the groove 156 is adapted to be aligned with the outer edge of the openings 190, and the inner edge 194 of the groove is adapted to overlie the central passage 172. Thus the openings 190 are selectively connected to the central passage 172, by rotating the valve disk.

Fluid supplied to the chamber 122 thus enters the capillary passage 184 as at 186 and follows the tube until it reaches the passage 188 which at that time is connected to the center passage 172 through the groove 156. In this way the same effect is obtained as in the case of the capillary tubes illustrated in Figures 6 to 10 inclusive.

With valves herein described, the effective valve area is not changed but the flow is regulated by the frictional resistance set up by increasing or diminishing the length of capillary tubing which is interposed between the inlet and outlet of the valve assembly.

It is to be understood that this invention is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. In a valve assembly, the combination of a housing having an inlet, an outlet, and a valve chamber connected to said inlet, a valve body disposed in said valve chamber, said valve body including a seat member seated in the housing within said chamber, said seat member having a passage therein, said housing having a passage therein communicating with said first named passage and the outlet, said seat member having a disk member having spaced recesses therein, a capillary tube connecting one of said recesses and the first named passage, a separate capillary tube extending between each adjacent recess whereby the recesses are connected in series with each other and with said first named passage through said capillary tubes, said capillary tubes being of different lengths but of substantially the same diameter, a closure for said chamber having a frictionally rotatable dial thereon, said dial having indicia thereon corresponding to the positions of said recesses, said valve body further including a movable head member having a stem extending outwardly of the closure and provided with a pointer movable over said dial, said head member having a disk member movable over said first named disk member, said last named disk member having a cut-out portion communicating with said chamber and adapted to selectively uncover said recesses upon rotation thereof whereby said recesses may be selectively connected to said chamber to thereby connect the first named passage to said chamber through the capillary tubes between said first named passage and the recess selected.

2. In a valve assembly, the combination of a housing having an inlet, an outlet, and a valve chamber connected to said inlet, a valve body disposed in said valve chamber, said valve body including a seat member seated in the housing within said chamber, said seat member having a passage therein, said housing having a passage communicating with said first named passage and the outlet, said seat member having a disk member having spaced recesses therein, a capillary tube connecting one of said recesses and the first named passage, a separate capillary tube extending between each adjacent recess whereby the recesses are connected in series with each other and with said first named passage through said capillary tubes, said capillary tubes being of different lengths but of substantially the same diameter, a closure for said chamber having a dial thereon, said dial having indicia thereon corresponding to the positions of said recesses, said valve body further including a movable head member having a stem extending outwardly of the closure and provided with a pointer movable over said dial, said head member having a disk member movable over said first named disk member, said last named disk member having a cut-out portion communicating with said chamber and adapted to selectively uncover said recesses upon rotation thereof whereby said recesses may be selectively connected to said chamber to thereby connect the first named passage to said chamber through the capillary tubes between said first named passage and the recess selected.

3. In a valve assembly, the combination of two valve members having adjacent surfaces in contact, means for rotating at least one of said members with respect to the other, one of said members having a plurality of capillary tubes carried thereby and connected to each other in series, said tubes being of predetermined lengths and being adapted to be the connections between an inlet and an outlet, said other member being provided with means operable in at least one relative adjusted position of said members for causing the tubes to be rendered inoperative whereby the inlet and outlet are disconnected, and said other member having means operable when said members are in other relative adjusted positions to render one or an increased number to include all of said serially connected tubes operative whereby the inlet and outlet are connected.

4. In a valve assembly, the combination of two valve members having contacting surfaces, one of said members being slidably adjustable relative to the other with said surfaces in contact, one of said members having a plurality of capillary tubes of predetermined lengths connected to each other in series and being adapted to be the connections between an inlet and an outlet, the other member being provided with means operable in at least one relative adjusted position of said members for causing the tubes to be rendered inoperative whereby the inlet and outlet are disconnected, and said other member having means operable when said members are in other relative adjusted positions to render one or an increased number to include all of said serially connected tubes operative whereby the inlet and outlet are connected.

5. A valve body comprising a valve seat, said seat having a series of recesses therein, capillary tubes having ends secured in certain recesses and ends secured in other recesses, the outlet of one tube and the inlet of another tube being disposed in common recesses whereby the tubes are serially connected to each other through said recesses.

6. In a valve assembly, the combination of a housing having inlet means and outlet means, a valve body disposed in said housing, said valve body including a seat member and a movable head member having end abutting relation, an operating stem for said head member, selected lengths of capillary passages associated with said seat member, one of said capillary passages communicating with one of said first named means, said passages being disposed in series from said passage communicating with said one of said first named means, each of said lengths having an opening in the abutting end of said seat member, and means provided in the abutting end of said head member cooperating with any selected opening for establishing communication between one or more of said serially connected capillary passages and the other of said first named means whereby fluid from the inlet passes through a selected variable number of lengths of said capillary passages to said outlet.

7. In a valve assembly, the combination of a valve housing having inlet and outlet means, a valve body within said housing, said valve body including a valve seat member and a head member, means for effecting relative rotary movement between said members, one of said members having a series of capillary passages variable in length adapted to provide communication between said inlet and outlet means, said members having means operable upon relative rotary movement between said members for selectively intercepting one or more of said lengths of passages to establish communication for fluid flow between said inlet and outlet means through said one or more lengths of passages, and means operable when said members are in a certain relative position with respect to one another for rendering said valve body inoperative to flow of fluid through said passages.

8. In a valve assembly, the combination of a valve housing having inlet and outlet means, a valve body within said housing, said valve body including a valve seat member and a head member, means for effecting relative rotary movement between said members, one of said members being formed with an inner portion having an abutment at one end and a spirally arranged capillary groove in communication with said outlet means and an outer portion in engagement with said abutment closing the crests of said groove, said inner portion having openings arranged around its axis each connecting said groove at different points with a passageway therein to provide a series of capillary passages variable in length, said members having means operable upon relative rotary movement between said members for selectively intercepting one or more of said lengths of passages to establish communication for fluid flow between said inlet and outlet means through said one or more lengths of passages, and means operable when said members are in a certain relative position with respect to one another for rendering said valve body inoperative to flow of fluid through said passages.

9. A valve assembly according to claim 8, wherein the means for establishing fluid flow between said inlet and outlet means comprises an axial passage in the inner portion of said one of said members communicating with the outlet means and a groove in the other of said members.

10. In a valve assembly, the combination of a housing having inlet means and outlet means, a valve body disposed in said housing, said valve body including a pair of valve seating members having end abutting relation, capillary passages of selected lengths associated with one of said members, one of said capillary passages communicating with one of said first named means, said passages being disposed in series from said passage communicating with said one of said first named means, said last named one of said members having a plurality of openings in the abutting end thereof corresponding in number to said lengths of passages and communicating therewith, the other of said members having means in the abutting end thereof cooperating with any selected opening for establishing communication between one or more of said serially connected capillary passages and the other of said first named means whereby fluid from the inlet passes through a selected variable number of lengths of said capillary passages to said outlet, and an operating stem for rotating one of said members with respect to the other extending outwardly of said housing for connecting said inlet and outlet means through any selected capillary passage.

11. In a valve assembly, the combination of a housing having inlet and outlet passages, a valve body disposed in said housing, said valve body including a seat member seated in the housing and having a disk portion provided with spaced openings therein, said seat member having capillary passages of different lengths communicating with said openings and with said inlet passage, said passages being serially arranged from said outlet passage to said inlet passage, said valve body further including a movable head member having an operating stem extending outwardly of said housing and having a disk member movable over said first named disk portion, said last named disk member having means including a cut out portion adapted to be moved into operative position with respect to any selected opening for establishing communication between one or more of said serially connected capillary passages and said outlet passage whereby fluid from inlet passes through a selected variable number of lengths of said capillary passages to said outlet.

12. In a valve assembly, the combination of a housing having an inlet, an outlet, and a valve chamber connected to said inlet, a valve body disposed in said valve chamber, said valve body including a seat member seated in said chamber, said seat member having a passage, said housing having a passage communicating with said first named passage and the outlet, a closure for said chamber, a dial having indicia thereon, said valve body further including a movable head member having a stem extending outwardly of the closure and provided with a pointer movable over said dial, and capillary tubes of selected lengths carried by said seat member, one of said capillary tubes being connected through said passages to the outlet, the other capillary tubes being connected in series to each other and to the last named capillary tube, said head member being selectively movable with respect to said seat member and having means cooperating therewith for connecting a selected number of the serially connected tubes providing communication between the chamber and the outlet through said tubes and passages, whereby fluid from the inlet passes through a selected number of tubes to said outlet, said indicia being placed whereby said pointer indicates any of the selected positions of said head member.

13. In a valve assembly, the combination of a housing having an inlet, an outlet, and a valve chamber connected to said inlet, a valve body disposed in said valve chamber, said valve body including a seat member, said housing having a passage communicating with the outlet, a closure for said chamber, a dial having indicia thereon, said valve body further including a movable head member having a stem extending outwardly of the closure and provided with a pointer movable over said dial, and capillary tubes of selected lengths carried by said seat member, conduit means for establishing communication between one of said capillary tubes and said passage, the other capillary tubes being connected in series to each other and to said last named capillary tube, said head member being selectively movable with respect to said seat member and having means cooperating therewith for connecting a selected number of the serially connected tubes providing communication between the chamber and outlet through said tubes, conduit means, and passage, whereby fluid from the inlet passes through a selected number of tubes to the outlet, said indicia being placed whereby said pointer indicates any of the selected positions of said head member.

HARRY BARNETT.
ERWIN SABALLUS.

References Cited in the file of this patent

UNITED STATES PATENTS

| Number | Name | Date |
|---|---|---|
| 1,754,138 | Agee | Apr. 8, 1930 |
| 1,964,300 | Perry | June 26, 1934 |
| 1,983,227 | Hall | Dec. 4, 1934 |
| 2,012,004 | Hall | Aug. 20, 1935 |
| 2,063,745 | Kucher | Dec. 8, 1936 |
| 2,236,084 | Brown | Mar. 25, 1941 |
| 2,279,066 | Sears | Apr. 7, 1942 |
| 2,299,540 | Hartline | Oct. 20, 1942 |
| 2,413,584 | Side | Dec. 31, 1946 |

FOREIGN PATENTS

| Number | Country | Date |
|---|---|---|
| 431,838 | Germany | July 17, 1926 |
| 444,102 | France | of 1912 |